(12) United States Patent
Grobe

(10) Patent No.: US 9,042,728 B2
(45) Date of Patent: May 26, 2015

(54) OPTICAL LINE TERMINATION NODE AND PASSIVE OPTICAL NETWORK

(75) Inventor: Klaus Grobe, Planegg (DE)

(73) Assignee: ADVA OPTICAL NETWORKING SE (DE)

( * ) Notice: Subject to any disclaimer, the term of this patent is extended or adjusted under 35 U.S.C. 154(b) by 230 days.

(21) Appl. No.: 13/401,023

(22) Filed: Feb. 21, 2012

(65) Prior Publication Data
US 2012/0275786 A1 Nov. 1, 2012

(30) Foreign Application Priority Data

Apr. 29, 2011 (EP) .................................. 11164359

(51) Int. Cl.
| | |
|---|---|
| H04J 14/00 | (2006.01) |
| H04B 10/032 | (2013.01) |
| H04B 10/2587 | (2013.01) |
| H04J 14/02 | (2006.01) |

(52) U.S. Cl.
CPC .......... *H04B 10/032* (2013.01); *H04B 10/2587* (2013.01); *H04J 14/0234* (2013.01); *H04J 14/0236* (2013.01); *H04J 14/0282* (2013.01); *H04J 14/0291* (2013.01); *H04J 14/0294* (2013.01); *H04J 14/0297* (2013.01)

(58) Field of Classification Search
USPC ....................................................... 398/45, 5
See application file for complete search history.

(56) References Cited

U.S. PATENT DOCUMENTS

| | | | | |
|---|---|---|---|---|
| 7,469,102 | B2* | 12/2008 | Lee et al. | 398/79 |
| 2002/0109876 | A1* | 8/2002 | Eijk et al. | 359/110 |
| 2003/0118280 | A1* | 6/2003 | Miyazaki et al. | 385/24 |
| 2004/0213574 | A1* | 10/2004 | Han et al. | 398/71 |
| 2005/0152696 | A1* | 7/2005 | Shin et al. | 398/71 |
| 2005/0158049 | A1* | 7/2005 | Lee et al. | 398/71 |
| 2005/0259988 | A1* | 11/2005 | Jung et al. | 398/72 |
| 2006/0093359 | A1* | 5/2006 | Lee et al. | 398/70 |
| 2006/0104638 | A1* | 5/2006 | Chung et al. | 398/71 |
| 2006/0120664 | A1* | 6/2006 | Lee et al. | 385/24 |
| 2007/0165688 | A1* | 7/2007 | Lee et al. | 372/71 |
| 2007/0206948 | A1* | 9/2007 | Lee et al. | 398/71 |
| 2009/0208212 | A1 | 8/2009 | Lee et al. | |
| 2009/0245799 | A1* | 10/2009 | Habel et al. | 398/79 |
| 2009/0290866 | A1* | 11/2009 | Chung et al. | 398/5 |
| 2009/0297152 | A1* | 12/2009 | Bainbridge et al. | 398/79 |
| 2010/0189442 | A1* | 7/2010 | Grobe | 398/79 |
| 2010/0260496 | A1* | 10/2010 | Tosetti et al. | 398/7 |
| 2010/0296808 | A1* | 11/2010 | Hinderthur | 398/5 |
| 2010/0316386 | A1* | 12/2010 | Luk et al. | 398/93 |
| 2011/0091210 | A1* | 4/2011 | Cheng | 398/61 |
| 2011/0091214 | A1* | 4/2011 | Cheng | 398/91 |
| 2011/0293265 | A1* | 12/2011 | Grobe et al. | 398/16 |
| 2013/0170834 | A1* | 7/2013 | Cho et al. | 398/58 |

* cited by examiner

*Primary Examiner* — Ken Vaderpuye
*Assistant Examiner* — Amritbir Sandhu
(74) *Attorney, Agent, or Firm* — Donald R. Boys; Central Coast Patent Agency, Inc.

(57) ABSTRACT

An optical line termination node has a first connection arrangement for connecting a working fiber, a second connection arrangement for connecting a protection fiber, a transceiver arrangement having first primary link and a first secondary link, and protection switching means configured for being switched either in a working operating state or in a protection operating state.

15 Claims, 8 Drawing Sheets

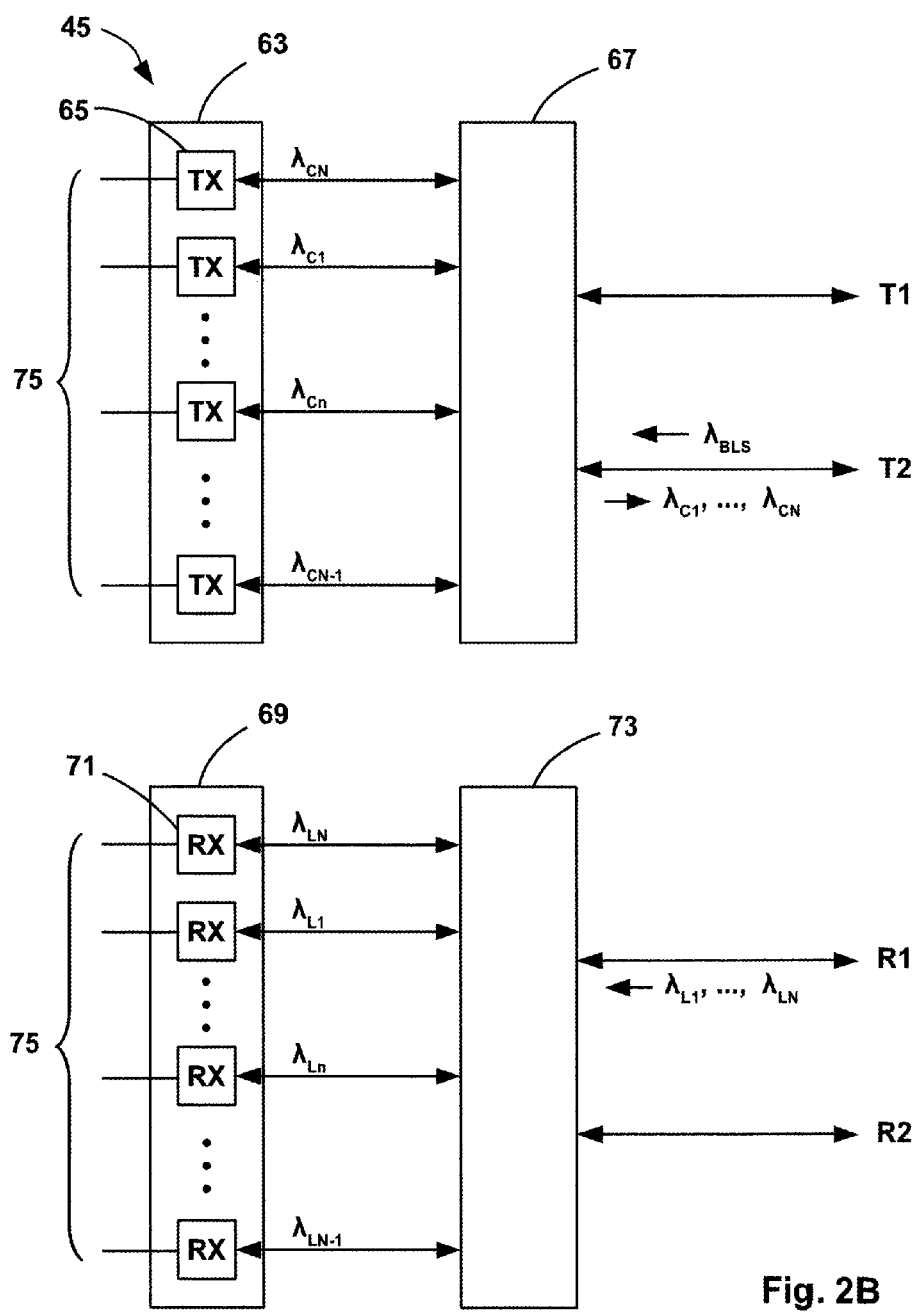

OPTICAL LINE TERMINATION NODE AND PASSIVE OPTICAL NETWORK

CROSS-REFERENCE TO RELATED DOCUMENTS

The present application claims priority to EP application 11164359.9, filed Apr. 29, 2011, which is incorporated herein in its entirety, at least by reference.

FIELD OF THE INVENTION

The present invention refers to an optical line termination node for a passive optical network. Furthermore, the present invention refers to a passive optical network.

BACKGROUND

Passive Optical Networks (PONS) are known in the art. They are typically used as access networks in order to connect multiple Optical Network Units (ONUs), which are typically located near a customer or are part of customer's premises, to an optical Line Termination (OLT) node, which typically interconnects the PON with a further communication network.

A PON may have at least one Remote Node (RN) connected to the OLT via a feeder fibre. The individual ONUs are connected by means of distribution fibres to the RN.

The feeder fibre between the OLT and the RN carries traffic between the OLT and multiple ONUs. If the feeder fibre breaks then multiple ONUs will lose connectivity with the further communication network. It is known to duplicate the feeder fibre in order to increase the availability of the PON. However, a known OLT that supports a duplicated feeder fibre is expensive and has a single point of failure.

SUMMARY

The object of the present invention is to provide an optical line termination node that supports duplicated feeder fibres, has a high availability and that can be inexpensively implemented.

This object is solved by an optical line termination node according to claim 1 and a passive optical network according to claim 14.

According to an embodiment, an optical line termination node for a passive optical network is provided, said node comprising
- a first connection arrangement for connecting a working fibre to the node;
- a second connection arrangement for connecting a protection fibre to the node;
- a transceiver arrangement having first primary link and a first secondary link;
- protection switching means configured for being switched either in a working operating state or in a protection operating state, in said working state the first connection arrangement being coupled with the first primary link for data communication over the working fibre and in said protection state the second connection arrangement being coupled with the first secondary link for data communication over the protection fibre;
- first coupling means being arranged for forwarding seeding light to the transceiver arrangement via the first primary link and second coupling means being arranged for forwarding the seeding light to the transceiver arrangement via the second primary link.

By using two separate coupling means, i.e. the first coupling means and the second coupling means, at least essentially separate signal paths for the working state and the protection state can be provided. At least essentially separate signals paths increase the availability of the optical line termination node.

In an embodiment, the protection switching means are arranged for connecting the first primary link with the first coupling means when in the operating state and/or for connecting the first secondary link with the second coupling means when in the protection state. Preferably, the protection switching means are arranged for disconnecting the first primary link and the first coupling means from each other when in the protection state and/or for disconnecting the first secondary link and the second coupling means from each other when in working operating state. In a preferred embodiment, the first coupling means are embedded in a signal path before the first connection arrangement and/or the second coupling means are embedded in a signal path before the second connection arrangement. If the first primary link is connected with the first coupling means then the first connection arrangement is coupled with the first primary link via the first coupling means. Accordingly, if the first secondary link is connected with the second coupling means then the second connection arrangement is coupled with the first secondary link via the second coupling means.

It is suggested that the first connection arrangement comprise a first splitter and/or combiner arranged for subdividing a bidirectional signal path within the working fibre into a primary downstream signal path and a primary upstream signal path within the node and/or the second connection arrangement comprises a second splitter and/or combiner arranged for subdividing a bidirectional signal path within the protection fibre into a secondary downstream signal path and a secondary upstream signal path within the node. Thus, the splitters may be connected to the working fibre and the protection fibre, respectively. As a consequence, upstream and downstream signal paths are separated within the node.

In particular, when using the connection arrangements having the splitters, it is advantageous to apply a transceiver arrangement having separate links for downstream data transmission and upstream data reception. Therefore, in an embodiment the first primary link and the first secondary link of the transceiver arrangement are transmitting links and the transceiver arrangement comprises a second primary link and a second secondary link, being receiving links. The transceiver arrangement may be configured for transmitting a downstream signal over the first primary link and the first secondary link and for receiving an upstream signal over the second primary link and the second secondary link. In other words, the transceiver arrangement may comprise four links, a primary pair of links for data communication when in the working state and a second pair of links for data communication when in the protection state.

According to a preferred embodiment, the protection switching means comprise a first optical switching element located within the downstream signal path between the first primary link and the first coupling means and a second optical switching element located within the downstream signal path between the second primary link and the second coupling means, the protection switching means being arranged for alternatively activating the first switching element and the second switching element. The switching element may function as an optical on-off switch. If the switching element is activated then parts of the signal path between which the switching element is located are connected, otherwise the parts are at least essentially disconnected from each other.

Preferably, the protection switching means comprise a third switching element located within the upstream signal path before the second primary link and a fourth switching element located within the upstream signal path before the second secondary link, the protection switching means being arranged for alternatively activating the third switching element and the fourth switching element.

In order to implement an inexpensive node, an embodiment is suggested according to which the node comprises a single seeding light source connected to the first coupling means and the second coupling means.

In another embodiment, the node comprises a first seeding light source connected to the first coupling means and a second seeding light source connected to the second coupling means. Using separate light sources increases the availability of the node.

In an embodiment, the node comprises at least one downstream signal booster located in the downstream signal path before the first connection arrangement, preferably before the first splitter and/or combiner, or the second connection arrangement, preferably before the second splitter and/or combiner, said signal booster being arranged for amplifying an optical signal output by the transceiver arrangement.

According to an embodiment, the node comprises at least one upstream preamplifier located in the upstream signal path after the first connection arrangement, preferably after the first splitter and/or combiner, or the second connection arrangement, preferably after the second splitter and/or combiner, said preamplifier being arranged for amplifying an upstream optical signal arriving from the working fibre or the protection fibre.

The line termination node can be used in connection with optical network units having a transmitter with light sources or with optical network units having a reflective transmitter. For operating a reflective transmitter seeding light must be coupled into the transmitter. Thus, in an embodiment the node comprises third coupling means arranged for forwarding seeding light to the working fibre and fourth coupling means arranged for forwarding seeding light to the protection fibre, said third coupling means being embedded in the downstream signal path before the first connection arrangement, preferably before the first splitter and/or combiner, and said fourth coupling means being embedded in the downstream signal path before the second connection arrangement, preferably before the second splitter and/or combiner.

In a preferred embodiment the first coupling means, the second coupling means, the third coupling means and/or the fourth coupling means corresponds to a circulator.

In order to a allow for reliable protection switching when using optical network units having reflective transmitters, in a preferred embodiment, the protection switching means comprise a fifth switching element located in a signal path before the third coupling means and/or a sixth switching element located in a signal path before the fourth coupling means, the protection switching means being arranged for alternatively activating the fifth switching element and the sixth switching element.

When implementing the node with two light sources, in an embodiment, the first coupling means and the third coupling means are connected to the first seeding light source and/or the second and the fourth light coupling means are connected to the second seeding light source.

In a preferred embodiment, the transceiver arrangement comprises a transmitter array having multiple transmitters, preferably multiple reflective transmitters, and transmitter arrayed waveguide grating, a port of each transmitter being connected to a port of the transmitter arrayed waveguide grating, and/or the transceiver arrangement comprises a receiver array having multiple receivers and a receiver arrayed waveguide grating, a port of each receiver being connected to a port of the receiver arrayed waveguide grating.

According to another embodiment, a passive optical network is provided, the network comprising an optical line termination node, said node comprising a first connection arrangement for connecting a working fibre to the node;

a second connection arrangement for connecting a protection fibre to the node;

a transceiver arrangement having first primary link and a first secondary link;

protection switching means configured for being switched either in a working operating state or in a protection operating state, in said working state the first connection arrangement being coupled with the first primary link for data communication over the working fibre and in said protection state the second connection arrangement being coupled with the first secondary link for data communication over the protection fibre;

first coupling means being arranged for forwarding seeding light to the transceiver arrangement via the first primary link; and second coupling means being arranged for forwarding the seeding light to the transceiver arrangement via the second primary link.

When implementing this network, the advantages of the above-described optical line termination node can be realized.

According to an embodiment, a passive optical network is provided, the network comprising an optical line termination node according to one of claims 1 to 13.

In order to improve the availability of the network an embodiment is suggested according to which the network comprises a primary remote node connected via the working fibre to the first connection arrangement and a secondary remote node connected via the protection fibre to the second connection arrangement. That is, the remote node is duplicated and a failure of a remote node therefore does not disconnect the optical network units connected to that remote node form the optical line termination node.

BRIEF DESCRIPTION OF THE FIGURES

Preferred embodiments and further advantages of the present invention are shown in the Figures and described in detail hereinafter.

FIGS. 2A and 2B show a transceiver arrangement of the network shown in FIG. 1;

DESCRIPTION OF THE EMBODIMENTS

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 8:
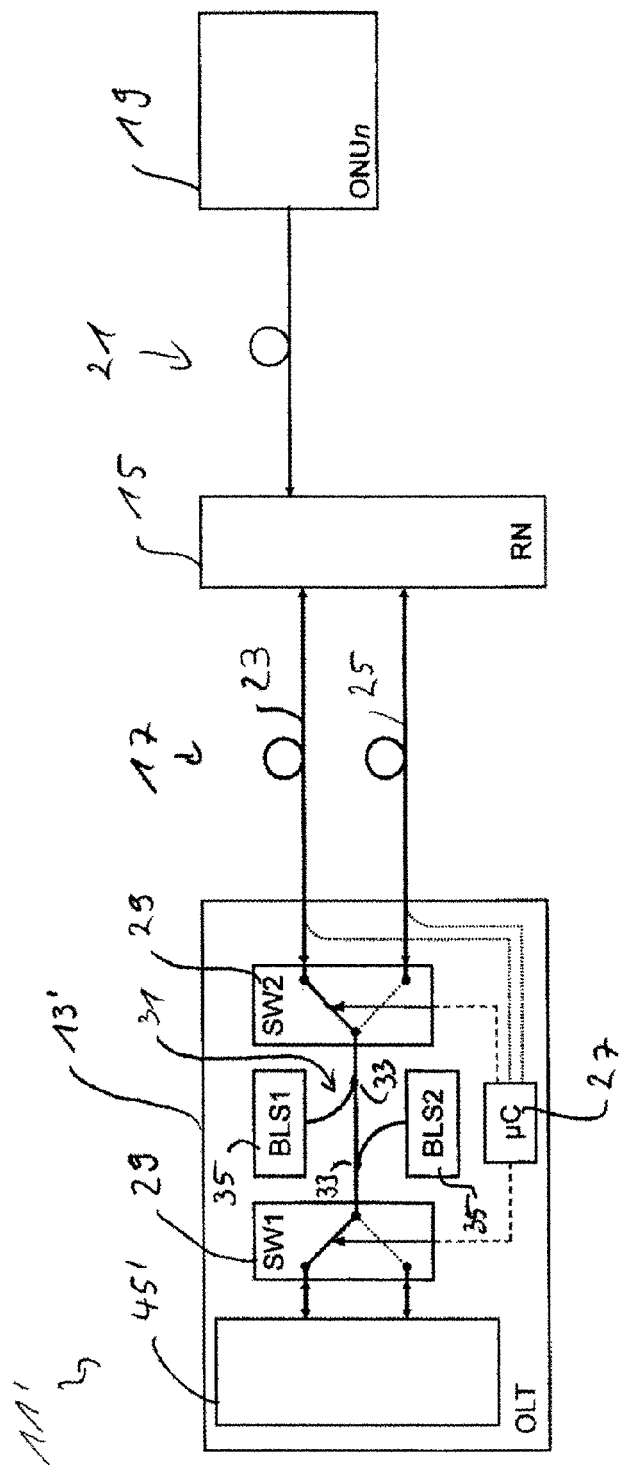
FIG. 8 shows a known passive optical network.

A known passive optical network 11' shown in FIG. 8 comprises known optical line termination 13' a remote node (RN 15) connected to the optical line termination 13 with feeder fibres 17, and multiple optical network units (ONU 19) connected to the remote node 15 by means of distribution fibres 21. Although the network 11' has multiple optical network units 19, only the optical network unit n is shown, where 1≤n≤N, with N denoting the number of optical network units 19 present in the network 11'.

The feeder fibres 17 comprise a working fibre 23 and a protection fibre 25. The optical line termination 13' is arranged for communicating over the working fibre 23 in case that both feeder fibres 17 are not defective. If the working fibre 23 is defective then the optical line termination 13 will automatically reconfigure itself so as to communicate over the protection fibre 25.

In order to perform a protection switch from the working fibre 23 to the protection fibre 25 a microcontroller 27 of the optical line termination 13' activates two optical changeover switches 29 for switching from a working signal path including the working fibre 23 to a protection signal path including the protection fibre 25.

As can be seen on FIG. 8, the working signal path and the protection signal path have a common section 31 including couplers 33 for coupling seeding light generated by seeding light sources 35. The common section 31 of the working signal path and the protection signal path constitutes single point of failure within the optical line termination 13' of the known network 11'. The couplers 33 cause a considerable attenuation of signals going through the common section 31 due to their insertion loss.

Figure 1:
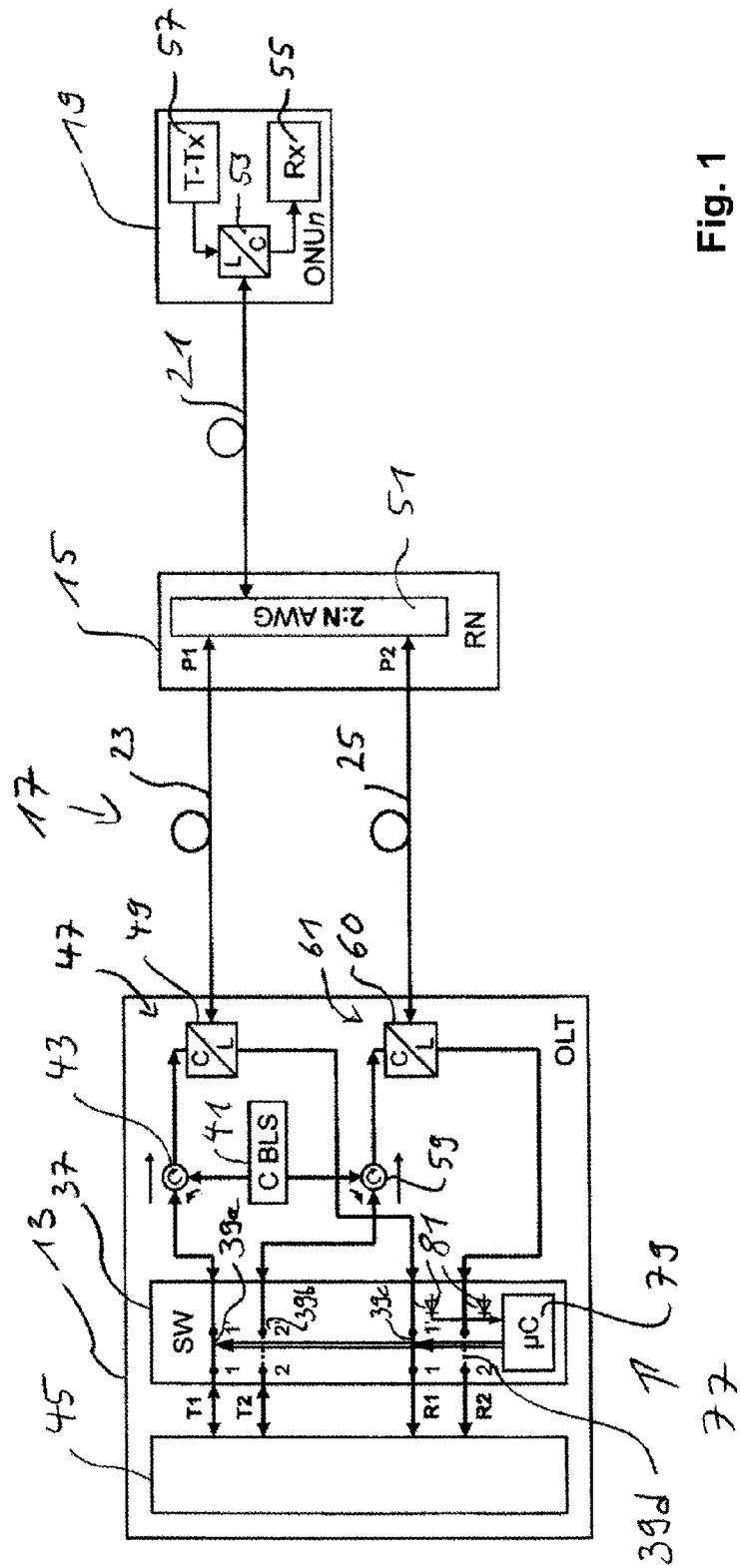
FIG. 1 shows a passive optical network according to a first preferred embodiment.

FIG. 1 shows a passive optical network 11 according to an embodiment of the present invention having a different optical line termination 13. In this optical line termination 13, the common section 31 has been eliminated. Moreover, the couplers 33 for inserting seeding light have been omitted. In addition, no optical changeover switches 29 are needed in the optical line termination 13 shown in FIG. 1. Instead of the changeover switches 29 the optical line termination 13 has protection switching means 37 comprising multiple optical on-off switches 39a-39d. In a preferred embodiment, the on-off switches 39a-39d do not have any moving parts, preferably they are electro-optical switches.

The optical line termination 13 has multiple signal paths. In the following, the signal paths that are used for data communication over the working fibre 23 are called primary paths and the signal paths used for data communication over the protection fibre 25 are called secondary signal paths.

A primary downstream signal path starts at a broadband light source 41 goes through first coupling means in the form of a first circulator 43, a first switching element 39a of the protection switching means 37 to a first primary link T1 of a transceiver arrangement 45 of the optical line termination 13. The transceiver arrangement 45 comprises multiple reflective transmitters, each of them being dedicated to a certain wavelength and arranged for emitting a modulated optical signal of that specific wavelength over the first primary link T1. Preferably, a bandwidth of seeding light generated by the broadband light source 41 includes the spectrum of all modulated optical signals generated by the transmitter of the transceiver arrangement 45. In other words, the broadband light source 41 may be arranged for generating seeding light for all reflective transmitters present in the transceiver arrangement 45.

The modulated signal goes back to the first circulator 43 via the same path as the unmodulated seeding light, i.e. the section of the primary downstream signal path between the first circulator 43 and the transceiver arrangement 45 is bidirectional. The first circulator 43 forwards the modulated optical signals to a first connection arrangement 47 including a first splitter and combiner 49. The signals of the primary downstream signal path belong to a first optical band, e.g. the C-band. The first splitter/combiner 49 is arranged for forwarding optical signals of the first band to the working fibre 23 connected to the first splitter/combiner 49. The primary downstream path comprises multiple optical signals having different wavelength and being generated by different transmitters of the transceiver arrangement 45.

The working fibre 23 is connected to a first port P1 of an Arrayed Waveguide Grating (AWG) 51. The Arrayed Waveguide Grating 51 is a 2:N AWG, with two ports, P1, P2 of one side of the AWG 51 being connected to the working fibre 23 and the protection fibre 25, respectively and N ports of another side of the AWG 51 being connected to different optical network units 19 via individual distribution fibres 21. The AWG 51 functions as a multiplexer-demultiplexer forwarding the different wavelengths in the downstream to separate optical network units 19 and combining upstream optical signals originating from different optical network units 19 having different wavelengths to a Wavelength Division Multiplex (WDM) signal and forwarding the WDM signal to the optical line termination 13.

The optical network unit comprises a splitter/combiner 53 arranged for forwarding an optical signal of the first optical band to a receiver 55 of the optical network unit 19 and for forwarding an upstream optical signal of the second optical band from a transmitter 57 of the optical network unit 19 to a distribution fibre 21 connected to the optical network unit 19. In the shown embodiment, the transmitter 57 is a tuneable transmitter having its own light source, e.g. a tuneable laser, for generating an upstream optical signal to being transmitted over the distribution fibre 21.

The primary downstream signal path goes through the arrayed waveguide grating 51 of the remote node 15, the distribution fibres 21, the splitter/combiners 53 of the individual optical network units 19, and ends at the receivers 55 of the individual optical network units 19. The receivers 55 may convert the received optical signal into an electrical signal.

A primary upstream signal path starts at the transmitters 57 of the individual optical network units 19 and goes through the splitter/combiner 53 and the distribution fibres 21. The arrayed-waveguide grating 51 combines the optical upstream signals generated by the individual optical network units 19 and outputs on the first port P1 a WDM signal. The primary upstream signal path continues through the working fibre 23 and goes to the first connection arrangement 47. The first splitter/combiner 49 forwards the signals of the primary upstream signal path to a switching element 39c of the protection switching means 37. Then the primary upstream signal path goes from the switching element 39c to a second primary link R1 of the transceiver arrangement 45.

A secondary downstream signal path starts at the broadband light source 41, goes through a second circulator 59 that forwards seeding light generated by the broadband light source 41 to a second switching element 39b of a protection switching arrangement 37. Then the secondary downstream signal path passes the second switching element 39b and enters the transceiver arrangement 45 via a first secondary link T2. A section between the first secondary link T2 and the second coupling means in the form of the second circulator 59 are bidirectional. Thus, the secondary downstream signal path returns from the first secondary link T2 via the second switching element 39b to the second circulator 59 and continues to a second splitter/combiner 60 of a second connection arrangement 61. Then the secondary downstream signal path goes through the protection fibre 25, a second port P2 of the arrayed waveguide grating 51 and over the distribution fibres 21 to the individual optical network units 19. Within each optical network unit 19, the light is transmitted over the splitter/combiner 53 to the receiver 55.

A secondary upstream signal path starts at the transmitters 57 of the individual optical network units 19, goes through the splitter/combiners 53 and the distribution fibres 21 to the arrayed-waveguide grating 51. The arrayed-waveguide grating combines the individual upstream signals generated by the individual optical network units 19 and feeds them into the protection fibre 25. The aggregated upstream signals arrive at the second splitter/combiner 59, which forwards them to a fourth switching element 39d of the protection switching means 37. The fourth switching element 39d is connected to a second secondary link R2 of the transceiver arrangement 45, where the upstream secondary signal path ends.

Figure 2A:
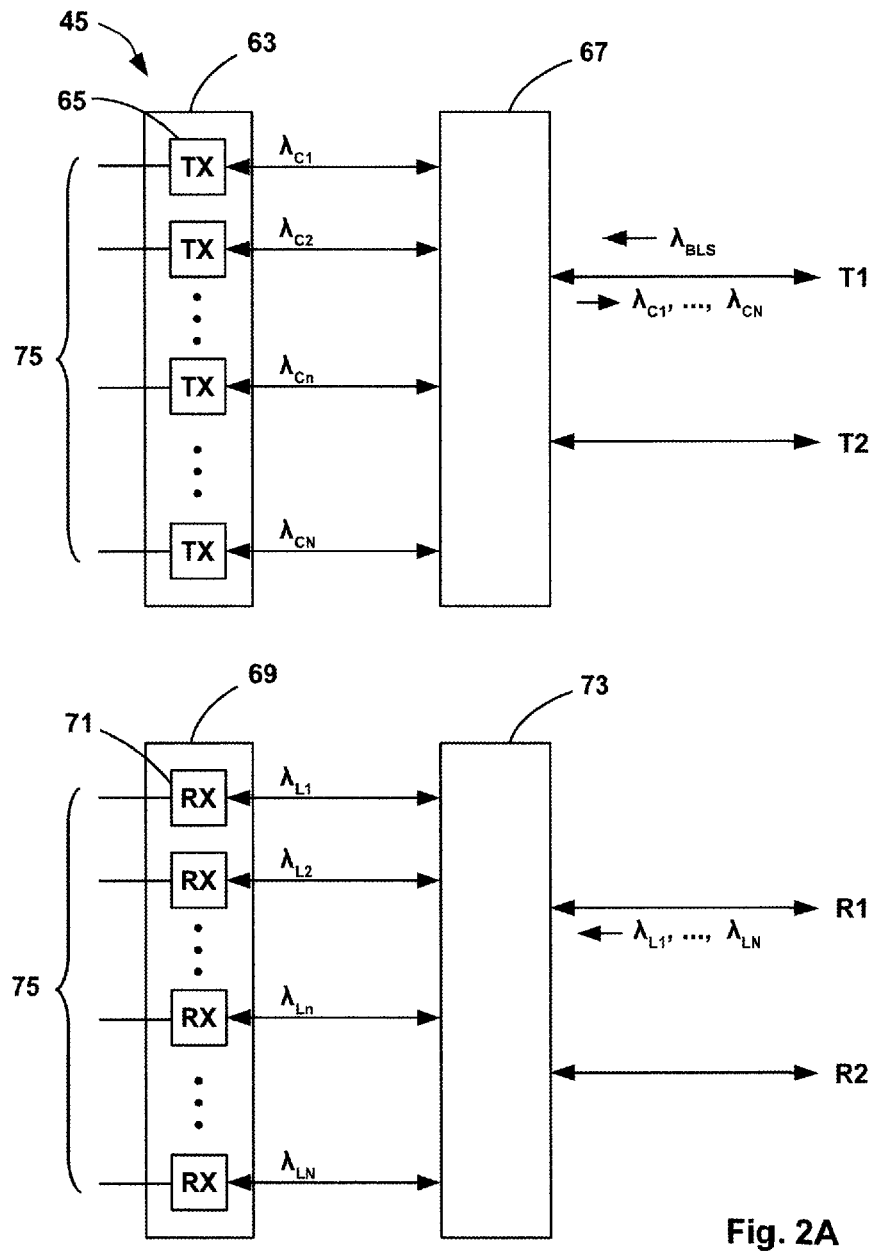

FIG. 2A shows the transceiver arrangement 45 in more detail. The transceiver arrangement 45 comprises a transmitter array 63 having multiple, preferably N, transmitters 65. A port of each transmitter 65 is connected to a port of a transmitter AWG 67. The transmitter AWG 67 is a N:2 AWG. Ports of one side of the transmitter AWG 67 are connected to the ports of the transmitters 65 and ports of another side of the transmitter AWG 67 are connected to the links T1 and T2 of the transceiver arrangement 45.

Furthermore, the transceiver arrangement 45 comprises a receiver array 69, the receiver array 69 including multiple, preferably N, receivers 71. Inputs of the receivers 71 are connected to the ports of one side of a N:2 receiver AWG 73. The two ports of the other side of the receiver AWG 73 are connected to the links R1 and R2 of the transceiver arrangement 45. Both the transmitters 65 and the receivers 71 may have electrical ports 75 that may be connected to an internal switching fabric of the optical line termination 13 and/or a further network such as a metro network or a wide area network for interconnecting the passive optical network 11 with a global communication system such as the Internet.

As shown in FIG. 1, the optical line termination 13 comprises control circuitry 77 including a microcontroller 79 or a microcomputer configured for controlling the switching elements 39 of the protection switching means 37. The control circuitry 77 comprises sensors 81 for monitoring signals of the upstream primary signal path and/or the upstream secondary signal path entering the optical line termination 13 via the working fibre 23 of the protection fibre 25. The control means 77 are arranged for activating the switching elements 39a-39d so that optical signals can pass the switching elements 39a-39d or deactivating the switching elements 39a-39d so that the optical signals are at least essentially prevented to from passing the switching elements. In the shown embodiment, the control circuitry 77 is arranged for alternatively activating the first switching element 39a and the second switching element 39b as well as the third switching element 39c and the fourth switching element 39d. In a working operating state of the optical line termination 13, the first switching element 39a and the third switching element 39c are activated, whereas the second switching element 39b and the fourth switching element 39d are deactivated. In a protection working state, the state of the switching elements 39 is inverse with respect to the working operating state, i.e. the first switching element 39a and the third switching element 39c are deactivated, whereas the second switching element 39b and a fourth switching element 39d are activated.

When operating the network 11, the control circuitry 77 monitors the incoming optical signals. If the control circuitry determines that signals are present at the working fibre and these signals have sufficient quality then the control circuitry sets the protection switching means 37 into the working state and activates and deactivates the switching elements 39a-39d accordingly. As shown in FIG. 2A, the links T1 and R1 of the primary signal paths are used. The seeding signal $\lambda_{BLS}$ emitted by the broadband light source 41 enters the transceiver arrangement 45 via the link T1 only. The spectrum of the seeding signal $\Lambda_{BLS}$ is subdivided into multiple wavelength $\lambda_{C1}, \ldots, \lambda_{CN}$. Each reflective transmitter 65 receives a dedicated wavelength $\lambda_{C1}, \lambda_{C2}, \ldots, \lambda_{Cn}, \lambda_{CN}$. The transceivers 65 modulate the seeding light and the transmitter AWG 67 forwards these modulated signals $\lambda_{C1}, \ldots, \lambda_{CN}$ to the link T1.

The receiver AWG 73 receives optical upstream signals $\lambda_{L1}, \ldots, \lambda_{Ln}, \ldots, \lambda_{LN}$ from the link R1 and forwards them to the individual receivers 71. Because the AWGs 67, 73 perform wavelength division multiplexing and de-multiplexing, respectively both the transmitters 65 as well as the receivers 71 may be colourless.

The control circuitry 77 is arranged for monitoring signals on the primary and/or secondary upstream signal path in order to detect a fail within one of the primary signal paths, for example a defective working fibre 23. If such a failure has been detected, the protection switching means 37 enters the protection working state and activates and deactivates the switching elements 39a-d accordingly. As a consequence, the links T1 and R1 are at least essentially dark and signals are transmitted over the links T2 and R2, as shown in FIG. 2B. Due to the properties of the two AWGs 67, 73 the assignment of wavelength $\lambda_{C1}, \ldots, \lambda_{CN}; \lambda_{L1}, \ldots, \lambda_{LN}$ to the individual transmitters 65 and the individual receivers 71 changes and a wavelength shift occurs. That is, the transmitter AWG 67 forwards the first wavelength $\lambda_{C1}$ to the second transmitter 65, which received the first wavelength $\lambda_{C1}$ in the working state. The wavelength $\lambda_{CN-1}$ is assigned to last transmitter 65. The wavelength $\lambda_{CN}$ is assigned to the first transmitter 65. The assignment of the wavelength to the remaining transmitters 65 is shifted accordingly, as shown in FIG. 2B. Because of the periodic forwarding behaviour of the transmitter AWG 67, the assignment of the wavelength to the transmitters 65 is rotated, as can be seen by comparing FIGS. 2A and 2B.

Furthermore, the same rotation of the wavelength assignment occurs at the receiving side of the transceiver arrangement 45. The first wavelength $\lambda_{L1}$ is assigned to a second receiver 71 instead of the first receiver 71. The last wavelength $\lambda_{LN}$ is assigned to the first receiver 71. The wavelength $\lambda_{LN-1}$ is assigned to the last receiver 75 (cf. FIGS. 2A and 2B).

After transition from the working operating state to the protection operating state the optical network units 19 will see the wavelength shift. In a preferred embodiment, the optical network units 19 automatically tune their tuneable transmitters 57 according to the wavelength shift in order to maintain a fixed relationship between a receiving wavelength $\lambda_{C_n}$ and a corresponding transmitting wavelength $\lambda_{L_n}$. Because the assignment of wavelength $\lambda_{C_n}$, $\lambda_{L_n}$ to the individual optical network units 19 change after a transition of the operating state, in a preferred embodiment, this wavelength shift is automatically compensated by the optical line termination 13 so that protection switching does not affect functional aspects of the higher layer protocols used in the network 11.

In the shown embodiment, the first optical band used in the downstream signal paths is the C-band and the optical band used in the upstream signal paths is the L-band. Thus, the splitters 49, 59 and 53 are C/L-splitters. However, in a different embodiment, different optical bands or wavelength ranges may be used in upstream and downstream direction, respectively.

The broadband light source 41 shown in FIG. 1 has two outputs connected to different circulators 43, 59. In a preferred embodiment, the broadband light source 41 has a light source element arranged for emitting seeding light and a coupler, preferably a 3 dB-coupler, configured for forwarding one part of the emitted light to the first circulator 43 and another part to the second circulator 59.

Figure 3:
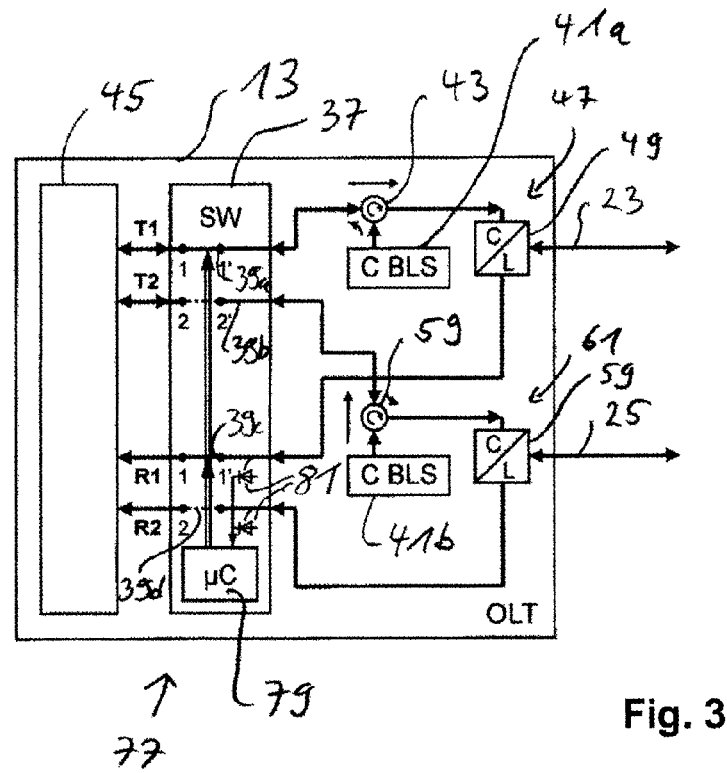
FIG. 3 shows an optical line termination node according to a second preferred embodiment.

In order to further improve the overall availability of the network 11, the broadband light source 41 may be duplicated, as shown in FIG. 3. Instead of using a single broadband light source 41, the optical line termination 11 shown in FIG. 3 has two separate broadband light sources 41a and 41b each of them being dedicated to the first coupling means implemented by means of the first circulator 43 and the second coupling means implemented by means of the second circulator 59, respectively. That is, both the primary downstream signal path and the secondary downstream signal path have dedicated broadband light sources 41a, 41b. The dedicated broadband light sources 41a, 41b do not require an integrated coupler, because they have only one output port.

As in the embodiment shown in FIG. 1, the optical line termination 11 shown in FIG. 3 uses the C-band for downstream communication. Therefore, the light sources 41, 41a, 41b are configured for generating a broadband seeding signal within the C-band, preferably covering all transmitted wavelengths $\lambda_{C_1}, \ldots, \lambda_{C_N}$.

Figure 4:
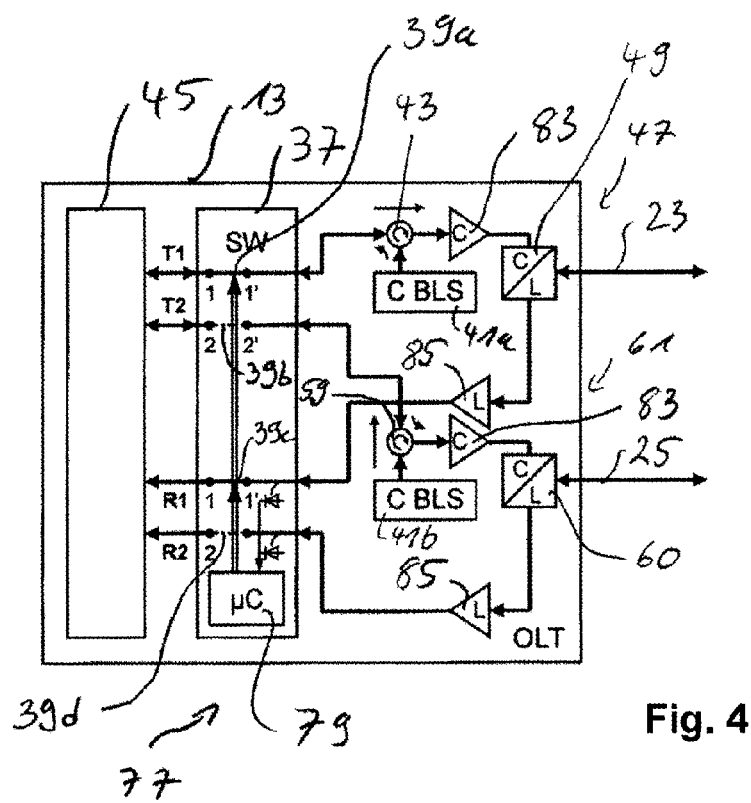
FIG. 4 shows an optical line termination node according to a third preferred embodiment.

According to an embodiment shown in FIG. 4 the primary downstream signal path and/or the secondary downstream signal path each may include at least one booster 83 for amplifying the downstream optical signals. The booster 83 may be placed at an arbitrary location within one of the downstream signal paths. Preferably, the booster 83 is located within the optical line termination 13. In the preferred embodiment shown in FIG. 4, the booster 83 is located in the signal path after the first coupling means (first circulator 43) and/or the second coupling means (second circulator 59). Preferably, the booster 83 may be placed between the first circulator 43 and the first splitter/combiner 49 of the first connection arrangement and/or the second circulator 59 and the second splitter/combiner 60 of the second connection arrangement 61.

Furthermore, the upstream signal paths may include a preamplifier 85. The preamplifier 85 may be located within the optical line termination 13, preferably in the primary or secondary upstream signal path after the first connection arrangement 47, in particular the first splitter/combiner 49 and/or after the second connection arrangement 61, in particular the second splitter/combiner 60. In the preferred embodiment shown in FIG. 4, a preamplifier is located between the first splitter/combiner 49 and the third switching element 39c of the protection switching means 37 and/or the second splitter/combiner 60 and the fourth switching element 39d of the protection switching means 37.

Another embodiment comprises the boosters 83 but not the preamplifiers 85. Yet another embodiment comprises the preamplifiers 85 but not the boosters 83. Preferably, the boosters 83 and/or the preamplifiers 85 are duplicated as shown in FIG. 4. A failure in one booster 83 or preamplifier 85 can be resolved by means of protection switching.

Figure 5:
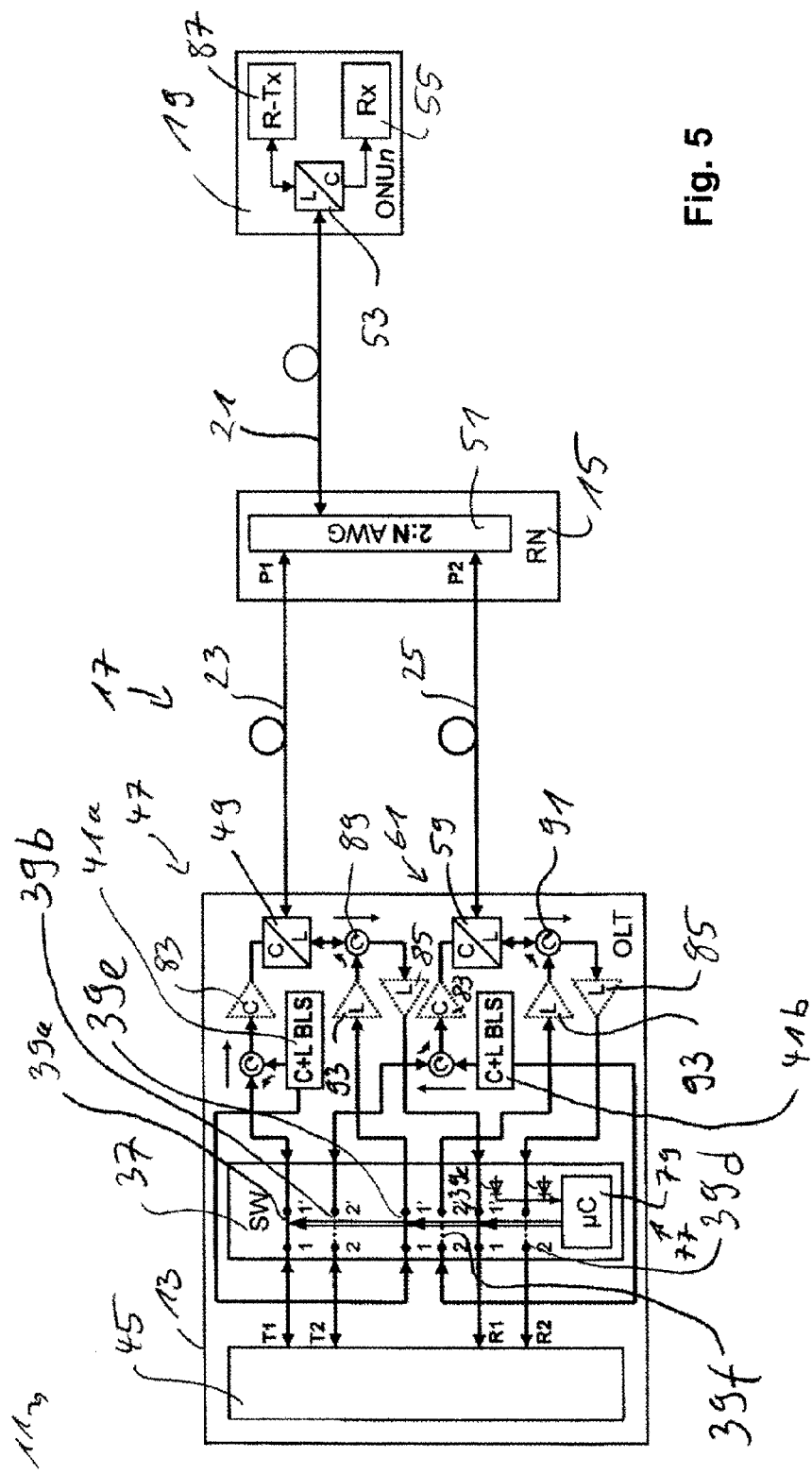
FIG. 5 shows a passive optical network according to a fourth preferred embodiment.

The network 11 shown in FIG. 5 has optical network units 19 comprising reflective transmitters 87 instead of the tuneable transmitters 57. Consequently, the optical line termination 13 has third coupling means implemented as a third circulator 89 for forwarding seeding light over the working fibre 23 to the reflective transmitter 87 and fourth coupling means in the form of a fourth circulator 91 arranged for forwarding the seeding light over the protection fibre 25 to the reflective transmitter 87. The first circulator 89 is connected to the first splitter/combiner 49 and belongs therefore to the primary upstream signal path. Accordingly, the second circulator is connected to the second splitter/combiner 60 and belongs therefore to the secondary upstream signal path.

The optical line termination 13 uses dedicated broadband light sources 41a and 41b for the primary and secondary signal path, respectively. The spectrum of the seeding light generated by the light sources 41a, 41b covers both the first optical band (e.g. C-band) and the second optical band (e.g. L-band). The first light source 41a is connected via a fifth switching element 39e of the protection switching means 37 to the first circulator. Optionally, a further booster 93 may be inserted between the fifth switching element 39e and the third circulator 89.

The second light source 41b is connected to the fourth circulator 91 via a sixth switching element 39f. Optionally, another booster 95 may be inserted between the sixth switching element 39f and the fourth circulator 91.

The control circuitry 77 of the protection switching mean 37a is configured to alternatively activate the fifth switching element 39e and the sixth switching element 39f. When in the working operating mode, the fifth switching element 39e is activated and the sixth switching element 39f is deactivated. When in protection switching operating mode, the fifth switching element 39e is deactivated and the sixth switching element 39f is activated. As a consequence, the optical line termination 13 forwards the seeding light via the working fibre when in working mode and via the protection fibre 25 when in protection switching mode.

Figure 6:
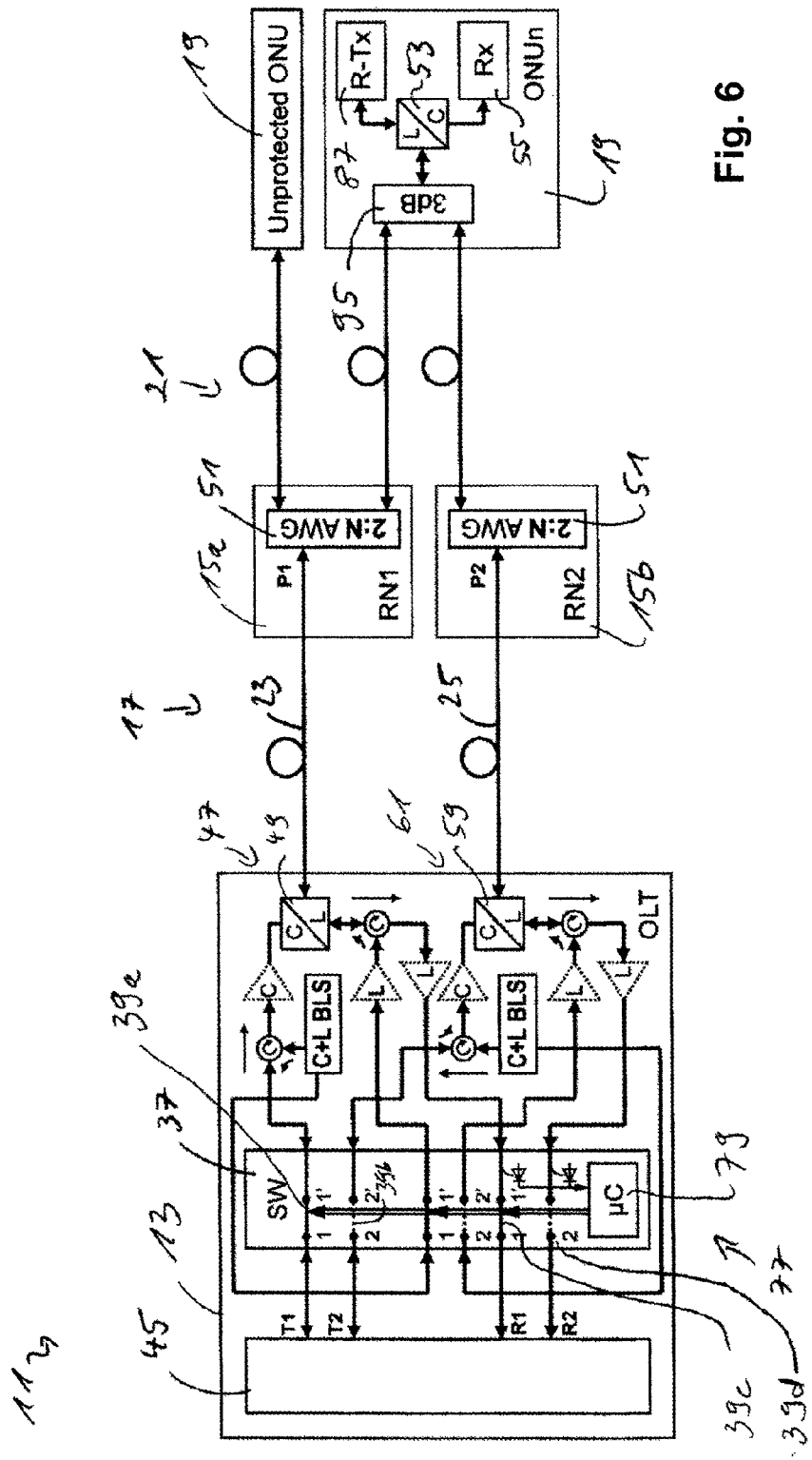
FIG. 6 shows a passive optical network according to a fifth preferred embodiment.

In the network 11 shown in FIG. 6 not only the feeder fibres 17 are protected but also at least some of the distribution fibres 17 are protected, i.e. at least one optical network unit 19 is connected to different remote nodes 15a, 15b by means of different distribution fibres 21. This network 11 has a primary remote node 15a comprising the AWG 51, the first port P1 of which is connected to the working fibre 23. The second port P2 is left open. Furthermore, the network 11 has a secondary remote node 15b the second port P2 of the AWG 51 of which is connected to the protection fibre 25. The first port P1 of the AWG of the secondary remote node 15 is left open.

The two fibres connected to different remote nodes 15a, 15b are coupled by means of a 3 dB-coupler 95 to the splitter/combiner 53 of the optical network unit 19.

As shown in FIG. 6, it is possible to combine unprotected optical network units 19 connected to the primary remote node 15a only with protected optical network units 19 connected to both remote nodes 15a, 15b.

Figure 7:
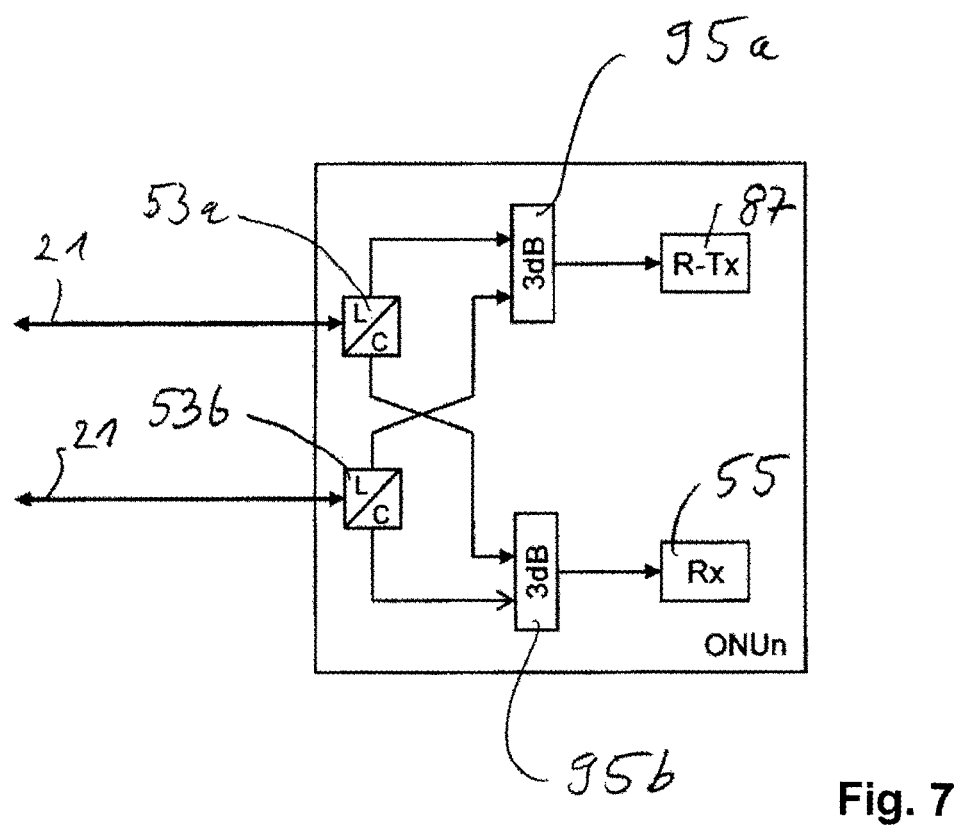
FIG. 7 shows an optical network unit according to a sixth preferred embodiment.

FIG. 7 shows an alternative embodiment of the protected optical network unit 19 shown in FIG. 6. This optical network unit 19 has separated splitters/combiners 53a, 53b and separate 3 dB-couplers 95a, 95b. Thus, both the splitter/combiners 53a, 53b as well as the 3 dB-couplers 95a, 95b are duplicated, with one splitter/combiner 53a, 53b and one 3 dB-coupler 95a, 95b being dedicated to the primary signal paths and the secondary signal paths, respectively.

To sum-up, the present invention provides a flexible protection scheme for the passive optical network 11 that allows to keep the remote nodes 15, 15a, 15b fully passive and eliminates single points of failure, such as the common section 31. It is possible, to increase the availability by including the distribution fibres and even the optical network units 19 into the protection scheme. The proposed protection scheme is compatible with both optical network units having tuneable lasers and optical network units having seeded reflective transmitters.

Several configurations of the network 11 are possible. N:2 AWGs may be used in all configurations. Therefore, 3 dB-couplers and insertion loss resulting thereof can be eliminated. Instead of changeover fibre switches, individual on-off switches are used. Using on-off switches allows increasing the availability by avoiding moveable parts within the protection switching means 37. If required, the remote node 15 can be split into the two remote nodes 15a, 15b.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. Optical line termination node for a passive optical network, said node comprising
    a first connection arrangement for connecting a working fibre to the node;
    a second connection arrangement for connecting a protection fibre to the node;
    a transceiver arrangement having first primary link and a first secondary link; and
    protection switching means configured for being switched either in a working operating state or in a protection operating state, in said working state the first connection arrangement being coupled with the first primary link for data communication over the working fibre and in said protection state the second connection arrangement being coupled with the first secondary link for data communication over the protection fibre;
wherein said node comprises
    first coupling means being arranged for forwarding seeding light to the transceiver arrangement via the protection switching means and the first primary link and
    second coupling means being arranged for forwarding the seeding light to the transceiver arrangement via the protection switching means and the first secondary link, wherein said second coupling means are separate from said first coupling means.

2. Node of claim 1, wherein the protection switching means are arranged for connecting the first primary link with the first coupling means when in the operating state and for connecting the first secondary link with the second coupling means when in the protection state.

3. Node according to claim 1, wherein the first connection arrangement comprises a first splitter and/or combiner arranged for subdividing a bidirectional signal path within the working fibre into a primary downstream signal path and a primary upstream signal path within the node and/or the second connection arrangement comprises a second splitter or combiner arranged for subdividing a bidirectional signal path within the protection fibre into a secondary downstream signal path and a secondary upstream signal path within the node.

4. Node according to claim 1, wherein the first primary link and the first secondary link of the transceiver arrangement are transmitting links and the transceiver arrangement comprises a second primary link and a second secondary link, configured as receiving links.

5. Node according to claim 1, wherein the protection switching means comprise a first optical switching element embedded in the downstream signal path between the first primary link and the first coupling means and a second optical switching element embedded in the downstream signal path between the first secondary link and the second coupling means, the protection switching means being arranged for alternatively activating the first switching element and the second switching element.

6. Node according to claim 1, wherein the protection switching means comprise a third switching element embedded in the upstream signal path before the second primary link and a fourth switching element located within the upstream signal path before the second secondary link, the protection switching means being arranged for alternatively activating the third switching element and the fourth switching element.

7. Node according to claim 1, wherein the node comprises a single seeding light source connected to the first coupling means and the second coupling means.

8. Node according to claim 1, wherein the node comprises a first seeding light source connected to the first coupling means and a second seeding light source connected to the second coupling means.

9. Node according to claim 1, wherein the node comprises at least one downstream signal booster located in the downstream signal path before the first connection arrangement or the second connection arrangement, said signal booster being configured for amplifying an optical signal output by the transceiver arrangement.

10. Node according to claim 1, wherein the node comprises at least one upstream preamplifier embedded in the upstream signal path after the first connection arrangement or the second connection arrangement, said preamplifier being configured for amplifying an upstream optical signal arriving from the working fibre or the protection fibre.

11. Node according to claim 1, wherein the node comprises third coupling means arranged for forwarding seeding light to the working fibre and fourth coupling means arranged for forwarding seeding light to the protection fibre, said third coupling means being embedded in the downstream signal path before the first connection arrangement and said fourth coupling means being embedded in the downstream signal path before the second connection arrangement.

12. Node according to claim 11, wherein the protection switching means comprise a fifth switching element located in a signal path before the third coupling means or a sixth switching element located in a signal path before the fourth coupling means, the protection switching means being arranged for alternatively activating the fifth switching element and the sixth switching element.

13. Node according to claim 1, wherein the transceiver arrangement comprises a transmitter array having multiple transmitters and transmitter arrayed waveguide grating, a port of each transmitter being connected to a port of the transmitter arrayed waveguide grating, and/or the transceiver arrangement comprises a receiver array having multiple receivers and a receiver arrayed waveguide grating, a port of each receiver being connected to a port of the receiver arrayed waveguide grating.

14. Passive optical network, comprising an optical line termination node, said node comprising
- a first connection arrangement for connecting a working fibre to the node;
- a second connection arrangement for connecting a protection fibre to the node;
- a transceiver arrangement having a first primary link and a first secondary link; and
- protection switching means configured for being switched either in a working operating state or in a protection operating state, in said working state the first connection arrangement being coupled with the first primary link for data communication over the working fibre and in said protection state the second connection arrangement being coupled with the first secondary link for data communication over the protection fibre;

wherein said node comprises
- first coupling means being arranged for forwarding seeding light to the transceiver arrangement via the protection switching means and the first primary link and
- second coupling means being arranged for forwarding the seeding light to the transceiver arrangement via the protection switching means and the first secondary link, wherein said second coupling means are separate from said first coupling means.

15. Network of claim 14, wherein the network comprises a primary remote node connected via the working fibre to the first connection arrangement and a secondary remote node connected via the protection fibre to the second connection arrangement.

* * * * *